UNITED STATES PATENT OFFICE.

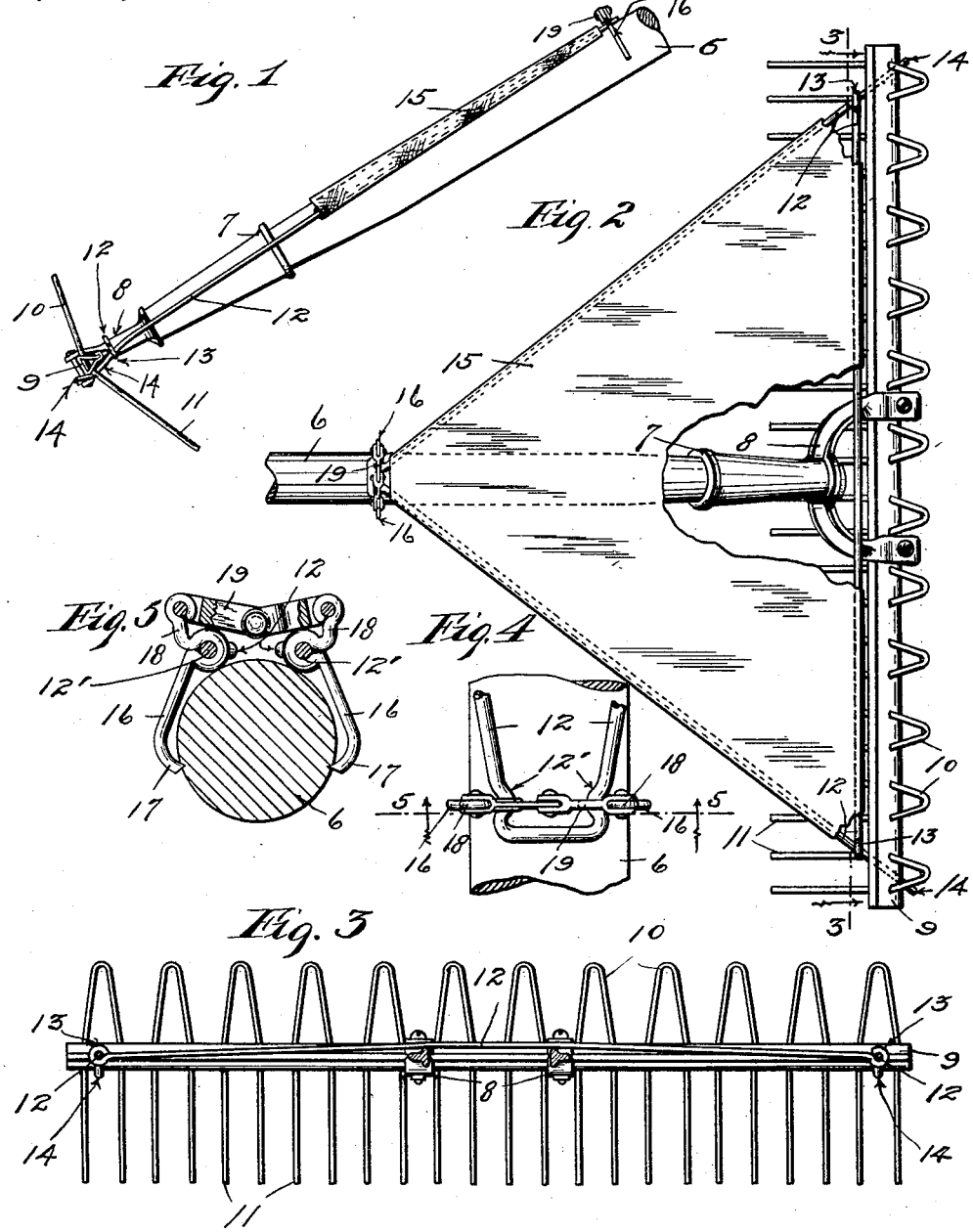

PETER MOQUIST, OF MINNEAPOLIS, MINNESOTA.

ATTACHMENT FOR GARDEN AND LAWN RAKES.

1,318,577.　　　　　Specification of Letters Patent.　　Patented Oct. 14, 1919.

Application filed December 21, 1918. Serial No. 267,751.

*To all whom it may concern:*

Be it known that I, PETER MOQUIST, a citizen of the United States, residing at Minneapolis, in the county of Hennepin, and State of Minnesota, have invented certain new and useful Improvements in Attachments for Garden and Lawn Rakes; and I do hereby declare the following to be a full, clear, and exact description of the invention, such as will enable others skilled in the art to which it appertains to make and use the same.

My invention has for its object to provide an attachment for garden and lawn rakes for facilitating the gathering of leaves, cut grass or other materials, by preventing the same from falling over the top of the rake teeth, during the raking operation.

To the above end, the invention consists of the novel devices and combinations of devices hereinafter described and defined in the claims.

In the accompanying drawings, which illustrate the invention, like characters indicate like parts throughout the several views.

Referring to the drawings,

Figure 1 is a view in side elevation with some parts broken away and illustrating the attachment applied to a lawn rake;

Fig. 2 is a plan view of the same;

Fig. 3 is a view partly in transverse section taken on the line 3—3 of Fig. 2;

Fig. 4 is a detail view in plan of the grapple; and

Fig. 5 is a detail view in transverse section, taken on the line 5—5 of Fig. 4.

Referring first in detail to the rake illustrated, the numeral 6 indicates a handle mounted in a socket 7 integrally formed with a bracket 8 secured to a head 9, having a double row of teeth, indicated by the numerals 10 and 11. The teeth 10 are blunt, while the teeth 11 are sharp, and either row of said teeth may be brought into operative position by reversing or turning the rake upside down.

Referring now in detail to the attachment for the rake, the numeral 12 indicates a triangular marginal frame formed, as shown, from two pieces of wire, one piece of said wire being bent upon itself to form the diverging sides of the frame, the other piece of said wire being arranged to form the front end of the frame 12. The front end member of the frame 12 extends parallel to the rake 9, rests at its intermediate portion upon the bracket 8, and has its ends bent to form a pair of eyes 13, through which the forward ends of the sides of said frame are extended to connect said two pieces of wire. The forward ends of the sides of the frame 12 are extended beyond or forward of the eyes 13 to afford a pair of prongs 14. These prongs, as shown, extend between the two outermost teeth 11, at each end of the respective row, and bear directly against the underside of the head 9. Preferably, as shown, the prongs 14 are downwardly curved to more securely hold the frame 12 to the head 9.

The body 15 of the attachment is in the form of a triangle piece of canvas or other fabric having its edge portions folded and stitched to afford hems through which the members of the frame 12 are inserted to detachably connect said body member thereto. The rear end portion of the frame 12 is detachably secured to the handle 6 by a grapple 16. The upper ends of the two members of the grapple 16 are pivoted, one to each of the side members of the frame 12 for swinging movement transversely of the handle 6 and the lower ends thereof are bent to form sharp hooks 17, arranged to engage opposite sides of said handle below the center thereof, as best shown in Fig. 5. To hold the grapple members against lateral movement on the side members of the frame 12, said members are bent at 12' to form seats therefor. The upper ends of the two members of the grapple 16 are also extended to afford a pair of short levers 18, the free ends of which are connected by a toggle 19 provided for operating the grapple. A downward pressure on the toggle 19 to straighten the same will cause the hooked ends of the grapple to bite into opposite sides of the handle 6, and thereby securely attach the frame 12 thereto. In operating the toggle to lock the grapple to the handle, the joint thereof is moved slightly below a dead center before coming to a positive stop against the pivoted ends of the grapple, and thereby securely locking said grapple in an operative position.

In applying the attachment to a rake, the prongs 14 thereof are first inserted under the head 9 with the front member of the frame 12 resting at its intermediate portion on top of the bracket 8. The rear end of the attachment is then pressed downward, until the pivoted ends of the grapple 16 engage the handle 6. During this movement of the attachment onto the handle 6, the front member of the frame 12 is bent over the bracket 8, thereby placing the ends thereof under tension to cause the same to lift and frictionally hold the prongs 14 in engagement with the underside of the head 9. The final movement of the attachment onto the handle 6 will cause the hooked ends of the grapple 16 to engage the handle 6, and thereby spread the same into a position to embrace said handle. With the grapple in this position, the toggle 19 is pressed downward past a dead center to secure the grapple to the handle. When the attachment is applied to a rake, the body member thereof rests upon the handle 6.

From the above description, it is evident that the attachment may be very quickly and easily applied to a rake, irrespective of the width thereof, or detached therefrom. It is also evident that the body member 15 will hold the leaves or other material, during the raking operation, and thereby prevent the same from falling over the rake head and upper row of teeth. It is, of course, understood that the attachment can be applied to an ordinary garden rake. The grapple is of such construction as to permit sufficient springing action thereof to fit handles that vary somewhat in different diameter. It may be here stated that the socket 7 and head 8, in a broad sense, form a part of the handle 6. In case the body 15 wears out, the same can very easily be replaced by a new one.

What I claim is:—

1. An attachment for garden and lawn rakes comprising a body member, a pair of prongs extending under the head of the rake, and a grapple connecting said frame to the handle of the rake, the forward portion of the body member being supported on said handle and bent upward thereby to place the outer ends thereof under tension and thus hold said prongs against the rake head.

2. An attachment for garden and lawn rakes comprising a body member having a marginal frame provided with a pair of prongs extending under the head of the rake, and a grapple connecting said frame to the handle of the rake, the forward member of the frame being supported on said handle and bent upward thereby to place the outer ends thereof under tension and thus hold said prongs against the rake head.

3. An attachment for garden and lawn rakes comprising a substantially triangular marginal frame formed from two wires, one of which is folded upon itself to afford a pair of diverging side members and the other of which wires has its ends secured to the outer end portions of the side members and forms the front member of said frame, the forward ends of said side members being extended under the rake head, a grapple connecting said frame to the handle of the rake, a flexible body member attached to said frame, the forward member of said frame being supported on said handle and bent upward thereby to place the outer ends thereof under tension and thus hold the side members of the frame against the rake head.

4. An attachment for garden and lawn rakes comprising a body member detachably secured to the head of the rake, and a grapple detachably connecting said body member to the rake handle, said grapple arranged to embrace opposite sides of the handle and having hooked ends adapted to engage said sides below the center of the handle, and a toggle for operating the grapple.

In testimony whereof I affix my signature in presence of two witnesses.

PETER MOQUIST.

Witnesses:
CLARA DEMAREST,
HARRY D. KILGORE.

Copies of this patent may be obtained for five cents each, by addressing the "Commissioner of Patents, Washington, D. C."